United States Patent [19]

Ishihara et al.

[11] Patent Number: 5,357,598
[45] Date of Patent: Oct. 18, 1994

[54] METHOD AND APPARATUS FOR CONTROLLING AN OBSTACLE AVOIDING ROBOT

[75] Inventors: Katsumi Ishihara, Tokyo; Masateru Yasuhara, Kawasaki, both of Japan

[73] Assignee: Canon Kabushiki Kaisha, Tokyo, Japan

[21] Appl. No.: 946,791

[22] Filed: Sep. 18, 1992

Related U.S. Application Data

[63] Continuation of Ser. No. 457,303, Dec. 26, 1989, abandoned.

[30] Foreign Application Priority Data

Dec. 27, 1988 [JP]  Japan ................................ 63-327657

[51] Int. Cl.$^5$ ........................ B25J 13/00; G05B 19/18
[52] U.S. Cl. ................................. 395/90; 395/82; 395/92; 901/3
[58] Field of Search ................. 395/90, 82, 92; 901/3

[56] References Cited

U.S. PATENT DOCUMENTS

| | | | |
|---|---|---|---|
| 4,011,437 | 3/1977 | Hohn | 395/82 |
| 4,250,438 | 2/1981 | Onoda | 364/174 |
| 4,338,672 | 7/1982 | Perzley et al. | 901/7 |
| 4,542,471 | 9/1985 | Inaba et al. | 364/185 |
| 4,571,694 | 2/1986 | Inaba et al. | 364/513 |
| 4,587,618 | 5/1986 | Oguchi | 364/167.1 |
| 4,600,869 | 7/1986 | Sekine et al. | 364/513 |
| 4,600,985 | 7/1986 | Nozawa et al. | 364/474.3 |
| 4,625,285 | 11/1986 | Mori et al. | 364/174 |
| 4,663,726 | 5/1987 | Chand et al. | 364/513 |
| 4,706,204 | 11/1987 | Hattori | 364/474.31 |
| 4,710,884 | 12/1987 | Tokairin et al. | 364/176 |
| 4,712,183 | 12/1987 | Shiroshita et al. | 395/82 |
| 4,722,063 | 1/1988 | Yasukawa et al. | 395/89 |
| 4,730,258 | 3/1988 | Takeda et al. | 364/513 |
| 4,743,819 | 5/1988 | Hashizume | 364/513 |
| 4,744,039 | 5/1988 | Suzuki et al. | 364/513 |
| 4,761,610 | 8/1988 | Svegander et al. | 324/237 |
| 4,808,898 | 2/1989 | Pearson | 901/38 |
| 4,815,007 | 3/1989 | Sakai et al. | 364/513 |
| 4,835,450 | 5/1989 | Suzuki | 364/513 |
| 4,835,718 | 3/1989 | Breyer et al. | 395/90 |
| 4,851,748 | 7/1989 | Daggett et al. | 364/513 |
| 4,853,603 | 8/1989 | Onoue et al. | 364/513 |
| 4,939,651 | 7/1990 | Onishi | 364/424.02 |
| 4,947,314 | 8/1990 | Sumida | 364/513 |
| 4,965,499 | 10/1990 | Taft et al. | 364/513 |
| 5,006,988 | 4/1991 | Borenstein et al. | 318/568.16 |
| 5,008,832 | 4/1991 | Tori et al. | 395/90 |

FOREIGN PATENT DOCUMENTS

| | | |
|---|---|---|
| 58-177289 | 10/1983 | Japan . |
| 60-132207 | 7/1985 | Japan . |
| 61-146487 | 7/1986 | Japan . |

*Primary Examiner*—Allen R. MacDonald
*Assistant Examiner*—George Davis
*Attorney, Agent, or Firm*—Fitzpatrick, Cella, Harper & Scinto

[57] ABSTRACT

There are provided method and apparatus for controlling a robot, in which when the robot is continuously controlled in different directions such that from the movement in the horizontal direction to the movement in the vertical direction, the movements in the horizontal and vertical directions from a predetermined position are executed in parallel during the movement in the horizontal direction. In the method, target movement positions in the horizontal and vertical directions are input, a first distance which is necessary to move the robot in only the vertical direction is input, and the predetermined position is determined on the basis of the target movement positions in the horizontal and vertical directions and the first distance. The movements in the horizontal and vertical directions include the equal acceleration motion and the equal deceleration motion. With this method, the operator can easily perform the programming and teaching of the robot such that the robot can reach a desired final target position while avoiding obstacles without colliding therewith in the shortest time.

15 Claims, 15 Drawing Sheets

FIG. 3

PROG. 1

1. PICK
2. SPEED $V_1$
3. ARCHUP $P_1$, $H_1$
4. OUT (1)
5. IF INP(1)=0 THEN STOP
6. SPEED $V_2$
7. ARCH $P_2$, $P_3$, $V_3$, $H_2$
8. OUT (2)
9. IF INP(2)=0 THEN STOP
10. ARCHDOWN $P_3$, $V_3$
11. PLACE

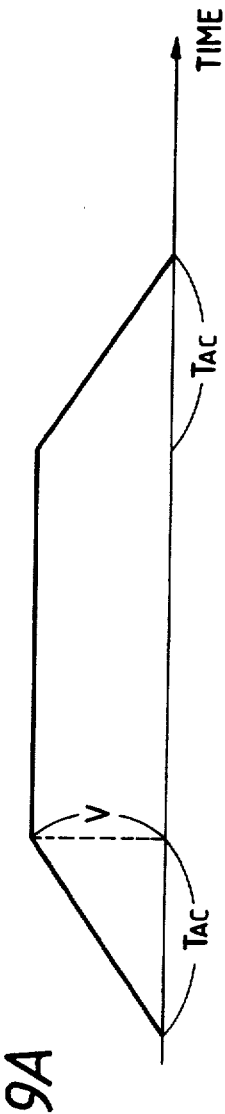
FIG. 8
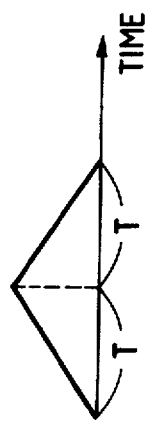
FIG. 9A
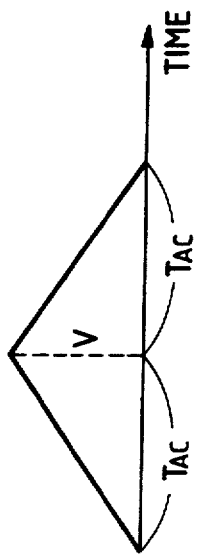
FIG. 9B
FIG. 9C

METHOD AND APPARATUS FOR CONTROLLING AN OBSTACLE AVOIDING ROBOT

This application is a continuation of application Ser. No. 07/457,303 filed Dec. 26, 1989, now abandoned.

BACKGROUND OF THE INVENTION

1. Field of the Invention

The present invention relates to a method and apparatus for controlling a robot in which, for instance, the orbit of a robot arm or the like is controlled in accordance with a program which has previously been written and, more particularly, to realize both of the high robot controlling speed and the safe orbit in the case of continuously executing the moving operations in different directions.

2. Related Background Art

As conventional techniques regarding the realization of a high speed in the continuous operation control of a robot, the techniques shown in, for instance, JP-A-58-177289, JP-A-60-132207, JP-A-61-146487, etc. are known.

The apparatus of JP-A-58-177289 comprises means for detecting the arm position and means for comparing the detected arm position with a predetermined position which has previously been stored, wherein when the arm has passed the predetermined position, the program steps progress even during the arm operation, thereby realizing the high control speed. In more detail, according to JP-A-58-177289, the movement in the horizontal direction is executed by a DC servo motor and the movement in the vertical direction is performed by an air cylinder. A chuck or the like is connected to the tip of the air cylinder. Assuming that a target position in the horizontal direction is point D, the air cylinder is driven at the time point when the arm passes a point D' before the point D, thereby starting the downward motion. The point D' is determined by presuming from the time required until the air cylinder arrives at the lowest position.

On the other hand, the control apparatus of JP-A-60-132207 uses DC servo motors for three axes and comprises: means for detecting the arm position; means for inputting an overlap area where the next operation can be started during the present arm operation; and means for discriminating whether the arm exists in the overlap area or not, wherein when the arm is located in the overlap area, the present movement command and the next movement command overlap to realize, the high control speed. The overlap area is input by the operation of an operator. The overlap area is defined as an area near a change point of the moving direction.

On the other hand, the apparatus of JP-A-61-146487 has a vertical movement control circuit and a horizontal movement control circuit which are independent of each other, wherein the horizontal movement is started by a timing signal from the vertical movement control circuit and the vertical movement is started by a timing signal from the horizontal movement control circuit. The timing signals are output by detecting the horizontal moving velocity so that the downward movement is finished after completion of the horizontal movement. In other words, when the horizontal movement and the downward movement overlap, the horizontal movement finishes early. At the time near the end of the downward movement, only the downward movement is executed, to realize high control speed and to prevent damage, accident, or the like, to the arm.

However, in the robot control, it is not always necessary to move the robot from the present position to a target position at high speed when the robot must clear an obstacle to arrive at the target position. In other words, if the robot cannot avoid an obstacle, high control speed may not be realized. The operations of the ascent→horizontal movement→descent per se must be executed because an obstacle exists between the present position and the target position although the robot inherently can reach the target position by only the horizontal movement. Such a situation will be appreciated, in the case of assembling a completed product from a plurality of parts where the robot must be controlled in a manner such that the robot finger gripping the part avoids an enclosure encasing the part and, further, both the finger and the part grasped by the finger do not collide with the semicomplete article during the assembly.

The above three conventional examples have a feature that the horizontal movement and the vertical movement are executed together in parallel for a certain period of time. The orbit which is obtained by the parallel motions in those two directions is specified by the synthesis of the moving velocities in those directions.

For instance, FIG. 14 shows orbits of the motions in the two directions which have been described in JP-A-61-146487. It is assumed that the time required from the start of the movement in the vertical (Z axis) direction to the arrival at the target position is set to a and the time required from the movement at a velocity $v_0$ in the horizontal (X axis) direction to the stopping of the motion is set to b and is set to a predetermined offset value so as to obtain a certain downward movement after completion of the horizontal movement. The start time of the downward movement is set to the time when the velocity in the horizontal direction becomes v.

$$v \leq \left(\frac{a}{b} - c\right)v_0$$

The above equation is satisfied only when it is assumed that the decelerating motion in the horizontal direction can be approximated by linear motion and the value of c is set to a small value. However, as shown in FIG. 14, if an obstacle 100 exists in the orbit of the parallel motions, the robot arm will be broken. Therefore, hitherto, a temporary target position in the vertical direction is set by repeating trials and errors by the operator so that the orbit of the parallel motions is set to enable an obstacle to be avoided and, thereafter, (only) the vertical movement is executed until the final target position in the vertical direction. However, in the process of the trials and errors, a serious accident may occur such that the robot collides with a tool or a workpiece or the like because the straight line portion upon descending cannot be specified. As the easiest method for avoiding such an accident, it is sufficient to merely reduce the parallel motion time period. However, such a method is contrary to the realization of high speed. This is because according to JP-A-61-146487, it is the primary object to define the period of time for the parallel motions on the basis of the decelerating velocity in the horizontal direction and the time which is required for the motion in the vertical direction and a viewpoint such that the highspeed control is realized without the safety feature of obstacle avoidance.

In the conventional example of JP-A-58-177289, as mentioned above, since the movement in the vertical direction is executed by the air cylinder, the position control is not executed, so that the safety is further unstable as compared with JP-A-61-146487.

On the other hand, according to JP-A-60-132207, since the overlap area must be input on the basis of the perception of the operator, safety and speed may not be adequate.

SUMMARY OF THE INVENTION

It is an object of the invention to provide method and apparatus for controlling a robot in which the foregoing drawbacks are eliminated.

It is another object of the invention to provide a method and apparatus for controlling a robot in which when the continuous operation of the robot is controlled in different directions, the robot is enabled to reach a target position in a short time and the latent possibility of the breakage of the robot is eliminated.

It is still another object of the invention to provide a method and apparatus for controlling a robot in which the operator can easily execute programming to teach the obstacle avoidance of an obstacle while maintaining high speed robot movement.

It is yet another object of the invention to provide a method and apparatus for controlling a robot in which before completion of the movement by a movement command of the robot, another command can be interpreted and executed.

The above and other objects and features of the present invention will become apparent from the following detailed description and the appended claims with reference to the accompanying drawings.

BRIEF DESCRIPTION OF THE DRAWINGS

FIG. 3 is a diagram showing a program which is used in the apparatus of the embodiment;

FIG. 8 is a diagram showing an example of a format of an I/O command which is used in a position determination control unit;

FIGS. 9A, 9B and 9C are diagrams showing examples of orbits which are used for the orbit plan in the embodiment, respectively;

DETAILED DESCRIPTION OF THE PREFERRED EMBODIMENTS

An embodiment in the case where the present invention is applied to a robot control apparatus of the XYZ$\theta$ axes will be described hereinbelow with reference to the drawings.

OUTLINE OF THE EMBODIMENT

Figure 1:
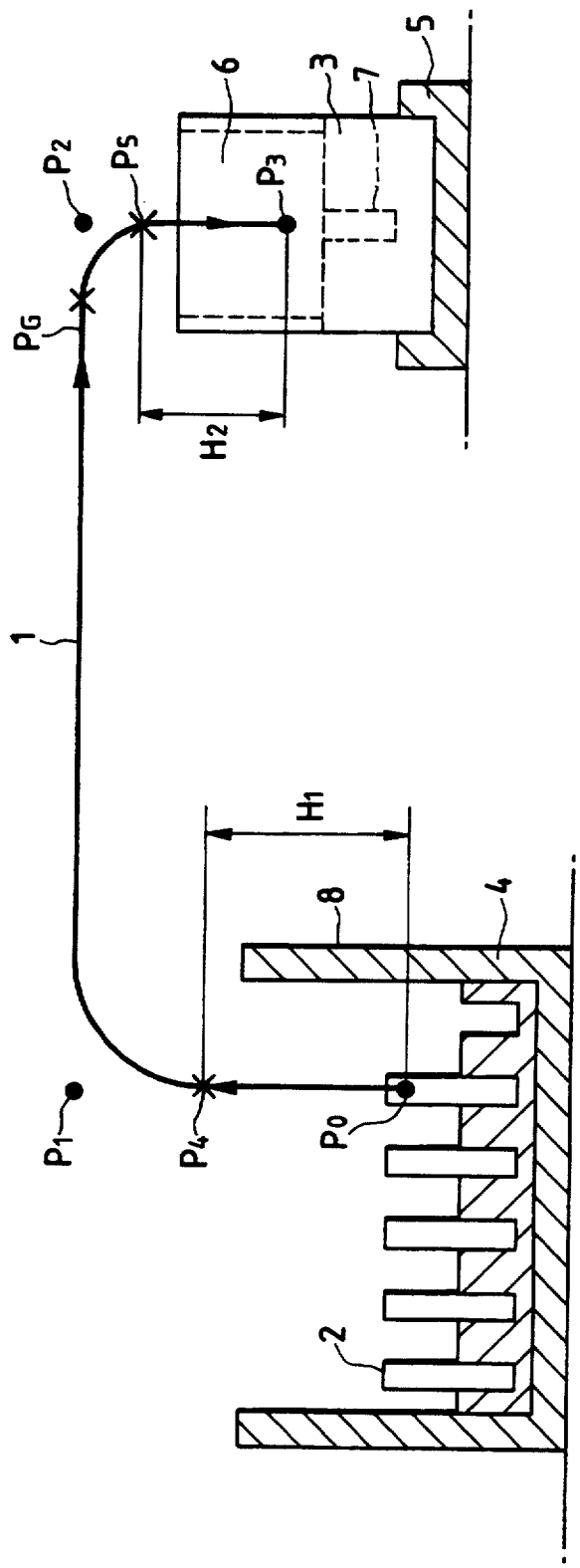
FIG. 1 is a side elevational view of an orbit by a robot control apparatus according to an embodiment of the invention.
Figure 2:
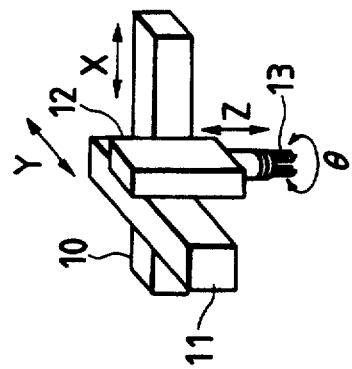
FIG. 2 is a block diagram showing an arm portion of the control apparatus.

FIG. 1 is a diagram for explaining the circumstances in which the robot in the embodiment is used and the operation of an arm of the robot. FIG. 2 shows a construction of the arm. In FIG. 1, reference numeral 4 denotes a magazine in which a plurality of parts 2 are enclosed. Reference numeral 3 indicates a workpiece held in a tool 5. The robot takes out one of the parts 2 from the magazine 4 and attaches it to the workpiece 3. A cavity 6 is formed in the workpiece 3. The part 2 is inserted into an inner concave portion 7 of the cavity 6.

In FIG. 1, for simplicity of explanation, it is assumed that the horizontal movement is executed in the X direction and the vertical movement is performed in the direction of a Z axis. To execute the assembling operations as mentioned above, it is necessary that the arm starts ascending from point $P_0$ and passes through points $P_4 \rightarrow P_G \rightarrow P_5$ and stops at point $P_3$. FIG. 3 shows a program to realize the above operations. In FIG. 3, a PICK command instructs a finder 13 to grasp the part 2. SPEED denotes a command to define a moving velocity of the arm; OUT indicates a command to turn on/off a special solenoid (not shown in FIG. 1) or the like; INP a command to input a status of a sensor (not shown in FIG. 1) or the like; ARCHUP an upward command; ARCH a horizontal movement command; and ARCHDOWN a downward command.

In the program of FIG. 3, the movement commands have the following formats.

ARCHUP $P_1$; $H_1$
ARCH $P_2$; $P_3$; $V_3$; $H_2$
ARCHDOWN $P_3$; $V_3$

Those commands are the peculiar commands in the embodiment and are set such as to define an object and to allow the arm to execute a motion of an orbit so as to avoid the obstacle.

To understand the commands, explanation will be continued by returning to FIG. 1.

As shown in the diagram, since the magazine 4 has a flange 8, when the vertical movement is started from point $P_0$, the arm must not collide with the flange. Therefore, only the vertical movement is executed for the interval from $P_0$ to $P_4$ and it is necessary to inhibit the horizontal movement during this period of time.

The command

ARCHUP $P_1$; $H_1$ denotes that the upward motion is executed toward point P1 and only the upward motion is performed for the interval of the distance $H_1$ and after the upward motion of the distance $H_1$ is executed, the next commands can also be executed in parallel. In the example of the program of FIG. 3, the next commands denote the commands of the line 4 and the subsequent lines and are substantially the ARCH command. Point $P_4$ is defined as a point which is higher than point $P_0$ by the distance $H_1$.

On the other hand, since the workpiece 3 has the shape mentioned above, as shown in FIG. 1, if at least only the vertical movement is not executed for the interval of the distance $H_2$ in the upper direction from the final target position $P_3$, the arm will collide with the flange of the workpiece.

The command

ARCH $P_2$; $P_3$; $V_3$; $H_2$ instructs horizontal movement toward point $P_2$ and denotes that the next program commands can be also executed in parallel at the time when the arm has passed through point $P_G$ which is specified by the final target position $P_3$, a descending speed $V_3$, and the distance $H_2$. In the example of FIG. 3, the next program commands denote the commands of line 8 and the subsequent lines and are substantially the command of

ARCHDOWN $P_3$; $V_3$

Point $P_5$ is defined as a point which is higher than point $P_3$ by the distance $H_2$.

Figure 4:
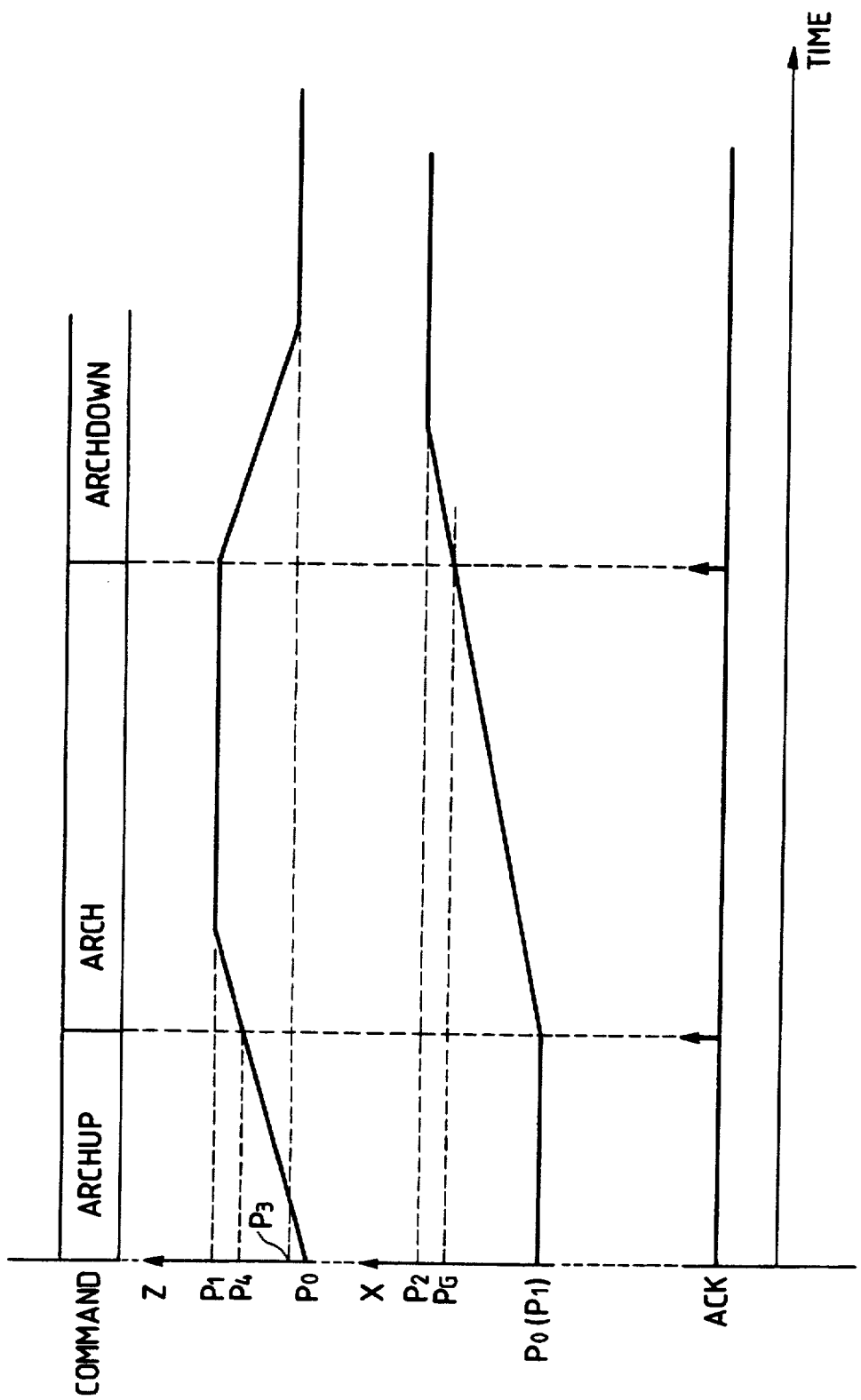
FIG. 4 is a timing chart showing a change in orbit in the embodiment of FIG. 1.

FIG. 4 is a diagram showing the motion of the arm in the case where the robot in the embodiment of FIG. 1 operated in accordance with the program of FIG. 3.

Point $P_G$ must be determined from the following viewpoints.

① Both the horizontal movement and the downward movement are executed in parallel after point $P_G$.

② Even the downward motion is started from $P_G$ the horizontal movement is continued and is finished at point $P_2$.

③ The horizontal movement is finished at the time when the downward motion has passed point $P_5$.

④ The downward motion is finished at point $P_3$.

Point $P_G$ determined from the above viewpoints is located in front of point $P_2$ by only a distance $\Delta x$ in the X direction. $\Delta x$ denotes the distance at which the arm moves in the horizontal direction for a time $T_{25}$ which is required when the motion in the Z direction is shifted from point $P_2$ to point $P_5$. The motions in the X and Z directions are not the simple equal velocity motions in general. In the embodiment as well, equal acceleration motion→equal velocity motion→equal deceleration motion are executed. The value of the time $T_{25}$ differs depending on whether point $P_5$ exists in the equal acceleration motion interval, the equal velocity motion interval or the equal deceleration motion interval, that is, it differs depending on the values of the distance $P_2P_3$ and the distance $H_2$. A method of determining $\Delta x$ will be described hereinafter.

CONSTRUCTION OF THE CONTROL APPARATUS

Figure 5:
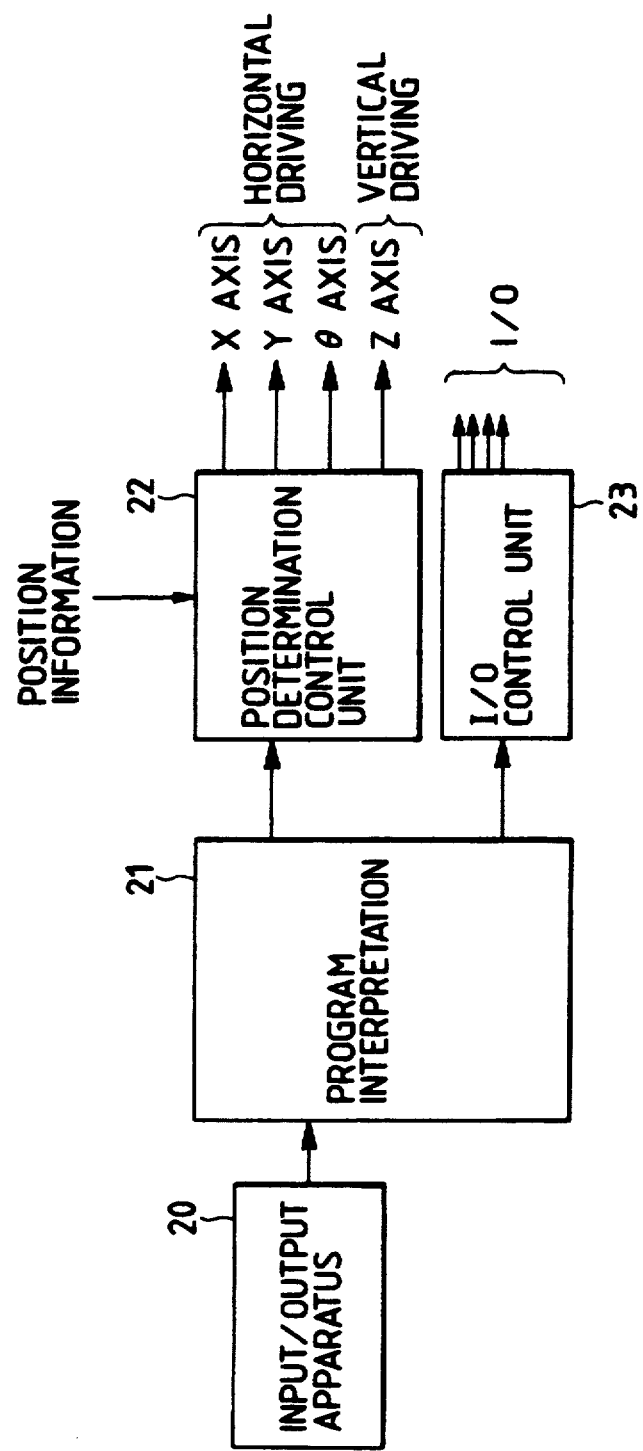
FIGS. 5 and 6 are diagrams for explaining constructions of the apparatus of the embodiment.

FIG. 5 shows a construction of the robot control apparatus of the embodiment. In the diagram, reference numeral 20 denotes an input/output apparatus to input the program as shown in FIG. 3; 21 indicates a portion having a microcomputer to interpret the input program; and 22 represents a position determination control unit to independently control XYZ axes and the $\theta$ axis. Practically speaking, the control unit 22 servo controls a servo motor (M in FIG. 6) by an output (position data) of an encoder (E in FIG. 6) directly coupled with the servo motor. Reference numeral 23 denotes an I/O control unit for driving a solenoid (25 in FIG. 6) of the finger 13 and for inputting an output of a sensor (26 in FIG. 6) to check whether the finger has grasped the part or not.

Figure 6:
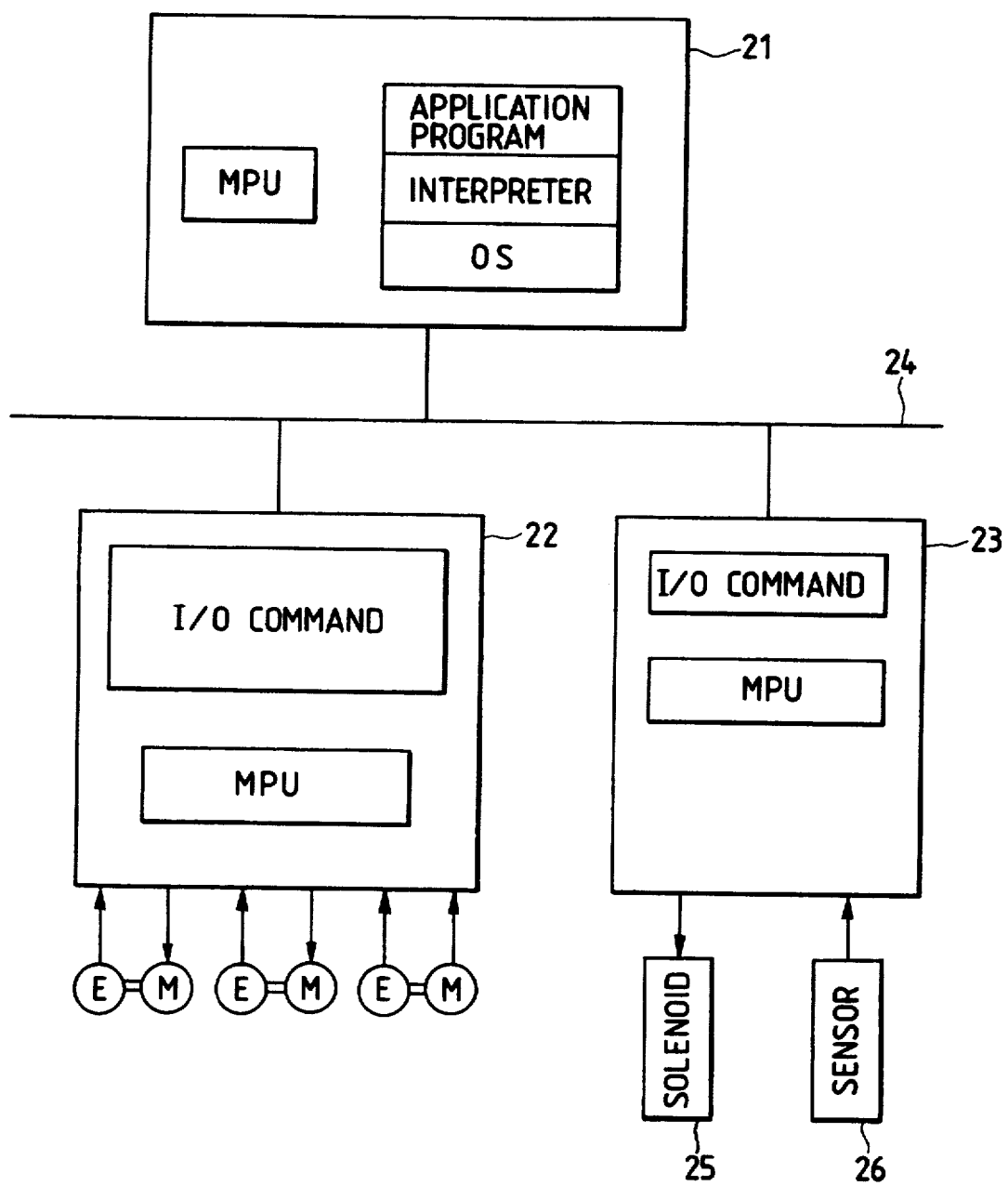
Figure 7:
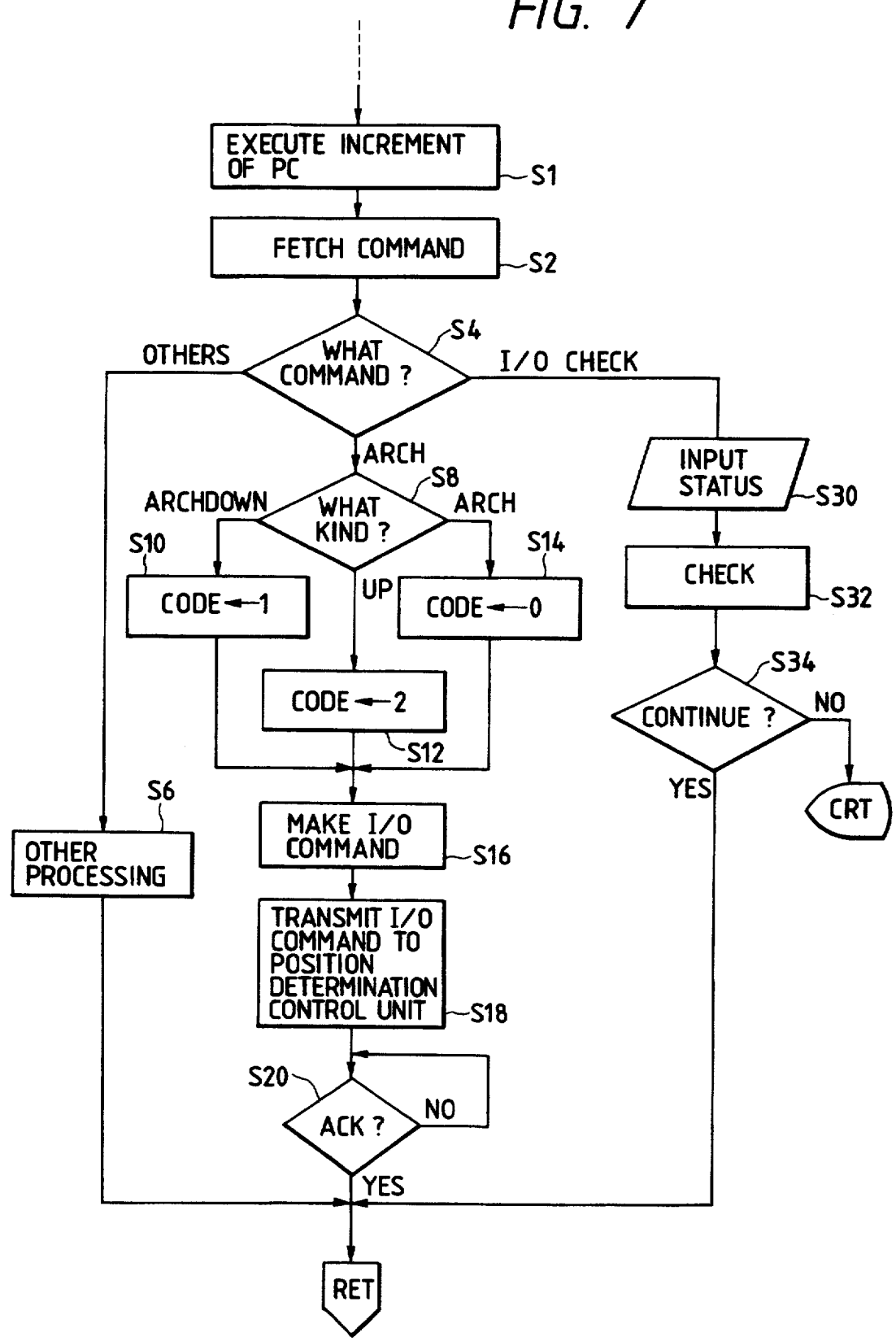
FIG. 7 is a flowchart showing a procedure of an interpreter in the apparatus of the embodiment.

FIG. 6 shows the relations among the program interpretation portion 21, the position determination control unit 22, and the I/O control unit 23 in FIG. 5. The program of the interpretation portion 21 comprises: the application program as shown in FIG. 3; an OS (operating system); and an interpreter to interpret the application program. FIG. 7 shows a part of a procedure of the interpreter. The program interpretation portion 21, position determination control unit 22, and I/O control unit 23 are connected by a system bus 24. The interpreter sends I/O commands as shown in FIG. 8 to the position determination control unit 22. The I/O commands comprise command codes and parameters in correspondence to the above three commands ARCHUP, ARCH, and ARCHDOWN. When the position determination control unit 22 receives the I/O commands, it executes the processes corresponding thereto. As shown in FIG. 9, the moving operation is performed on the basis of the well-known trapezoidal control. That is, equal acceleration motion→equal velocity motion→equal deceleration motion are executed. In the trapezoidal control which is used in the embodiment, the acceleration upon acceleration/deceleration is given by $$\alpha = \frac{V}{T_{AC}} \qquad (1)$$

assuming that a velocity in the equal velocity motion is set to V, an acceleration time period which is required until the velocity reaches V is set to $T_{AC}$, and a deceleration time period which is required from the velocity V to the stop is set to $T_{AC}$. On the other hand, the distance of the movement which is executed from the velocity "0" to the time point when the velocity is accelerated to V or the distance of the movement which is executed from the velocity V to the time when the velocity is decelerated to "0" is given by $$\tfrac{1}{2} V T_{AC} \qquad (2)$$

FIG. 9B shows a state in which after the velocity had been accelerated to V, it was soon immediately to "0". The total movement distance in the case of FIG. 9B is $$V T_{AC}$$

from equation (2). FIG. 9C shows a state in which after the velocity had been accelerated at the acceleration $\alpha$ for only a period of time T ($< T_{AC}$), it was decelerated to "0". At this time, the movement distance is $$2 \cdot \frac{1}{2} \cdot \frac{V}{T_{AC}} \cdot T^2 \qquad (3)$$

The equation (1) to (3) are often referred to when obtaining point $P_G$.

SEQUENCE TO EXECUTE THE FETCHING OF COMMANDS

Figure 10A:
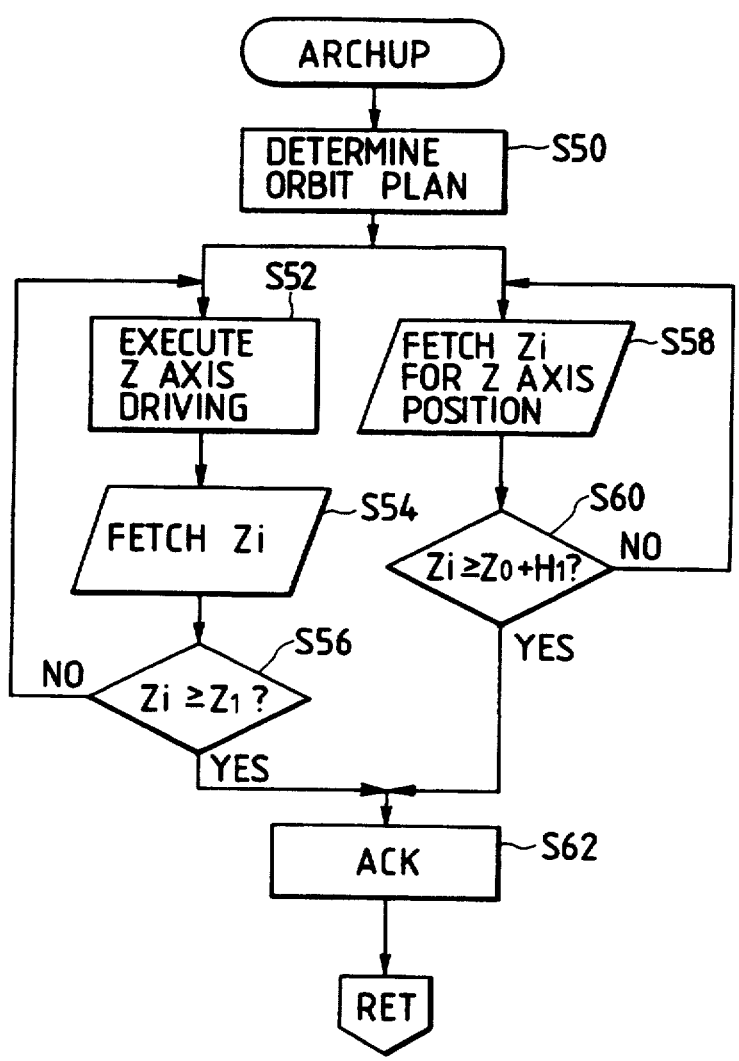
FIGS. 10A, 10B and 10C are flowcharts showing control procedures in the position determination control unit.

A situation such that before the commands of ARCH and the like are completely executed, the next commands can be executed (what is called a pipeline execution control) will be explained by using a control procedure of an interpreter program shown in FIG. 7 and control procedures of the I/O command execution program in the position determination control unit shown in FIGS. 10A to 10C. With such a pipeline execution control, the programmer can write the program in a manner such that during the execution of the ARCH command or the like, not only the other ARCH commands but also an OUT command, an INP command, and the like can be executed in parallel.

The operations based on the interpreter program and the servo control program in the I/O control unit will now be described with reference to FIGS. 7 to 10. The coordinates of each point in FIG. 1 are defined. As mentioned above, since the movement of the arm is considered by only the XZ system, $$P_0 = (x_1, z_0)$$

$$P_1 = (x_1, z_1)$$

$$P_4 = (x_1, z_0 + H_1)$$

$$P_G = (x_G, z_1)$$

$$P_2 = (x_2, z_1)$$

$$P_5 = (x_2, z_3 + H_2)$$

$$P_3 = (x_2, z_3)$$

In step S1 in FIG. 7, the count value of a program counter PC is increased by "1". In step S2, the command pointed by the PC is fetched. In step S4, a check is made to see if the fetched command is a command regarding the ARCH (jump to step S8) or a command regarding the I/O (jump to step S30) or other commands. If it is the command about the ARCH, command codes (ARCH=0, ARCHUP=1, ARCHDOWN=2) are set in steps S8 to S14. In step S16, an I/O command is made by adding a parameter as shown in FIG. 8 for every command. The I/O command is sent to the position determination control unit 22. In step S20, the apparatus waits for the input of an ACK signal from the control unit 22. As will be understood from FIG. 4 and the description of the servo control procedure, which will be explained hereinafter the ACK signal is returned from the position determination control unit 22 when the robot has passed through the intermediate point such as P4, P5, etc. Upon reception of the ACK signal, the control routine is returned to the main routine (not shown) and the above-mentioned procedure is again executed from step S1. That is, in the case of the command regarding ARCH, if the ACK signal is returned from the position determination control unit 22, the interpretation portion 21 fetches the next command in the program and executes it. Therefore, the parallel processes of the commands related to ARCH or the parallel processes of both of the commands related to ARCH and the other commands can be executed. In the embodiment, particularly, the parallel processes of the commands at the level of the advanced language as shown in FIG. 3 can be performed. Before progressing from the command regarding ARCH to another command regarding ARCH, for instance, as shown in FIG. 3, the programmer inserts the INP command or the like, thereby making it possible to progress to the subsequent ARCH command after confirming that the finger 13 normally operates.

On the other hand, if the command is the check command (INP) of the I/O device, in step S30, status data is required for the I/O control unit 23. In step S32, the content of the input status is checked. If the status data is correct, the processing is returned to the main routine and the next command is fetched.

If the command is, for instance, the command (e.g., command OUT) to drive a solenoid or the like, step S6 follows and such a command is executed. That is, the I/O command to drive a predetermined solenoid is sent to the I/O control unit 23.

In the position determination control unit 22, on the basis of the code of the I/O command sent from the interpretation portion 21, a check is made to see if the command is the ARCHUP command, ARCH command, or ARCHDOWN command.

DETAILS OF THE EXECUTION OF THE ARCHUP COMMAND

The operation when
ARCHUP $P_1$; $H_1$
was programmed with now be described. The ARCHUP command is shown in FIG. 10A. In step S50, an orbit plan is made. The orbit plan is formed to determine the position at which the equal acceleration motion is executed, the position at which the equal velocity motion is performed, and the position from which the deceleration motion is started in the case where the velocity is controlled by the trapezoidal control shown in FIG. 9 when the robot moves from point $P_0$ to point $P_1$. The loop in steps S52 to S56 and the loop in steps S58 to S60 are executed in parallel.

In the loop in steps S52 to S56, the servo motor in the Z direction is driven (step S52), an encoder output ($z_i$) is read (step S54), and a check is made to see if the position of the arm in the Z direction has exceeded point $P_1(z_i > z_1)$ or not (step S56). In the loop in steps S58 to S60, the encoder output ($z_i$) is read (step S58) and a check is made to see if the position of the arm in the Z direction has exceeded point $P_4(z_i > z_0 + H_1)$ or not (step S60). When the Z axis is set in the upward direction in FIG. 1, the timing when the answer in step S60 is discriminated to be YES is earlier than the timing when the answer in step S56 is determined to be YES. Therefore, the process in step S62 is executed and the ACK signal is returned to the interpretation portion 21. As mentioned above, the interpretation portion 21 can fetch the next command by the ACK signal.

DETAILS OF THE EXECUTION OF THE ARCH COMMAND

Figure 10B:
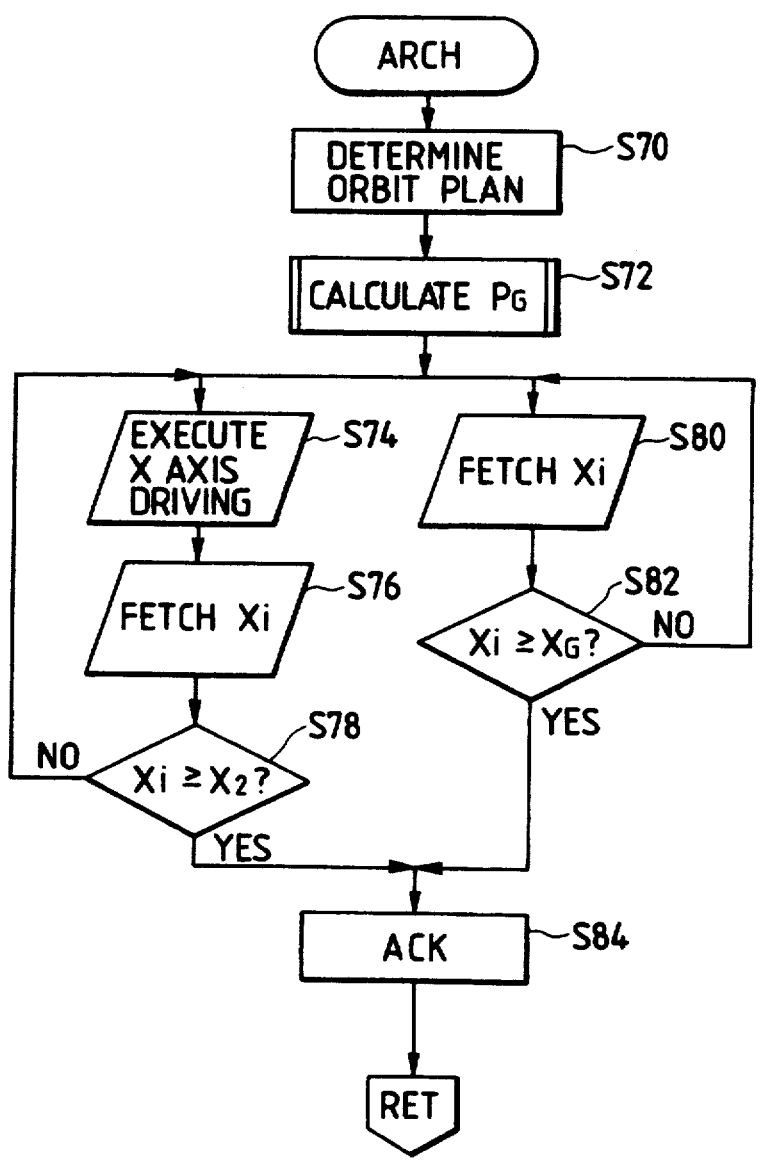
Figure 10C:
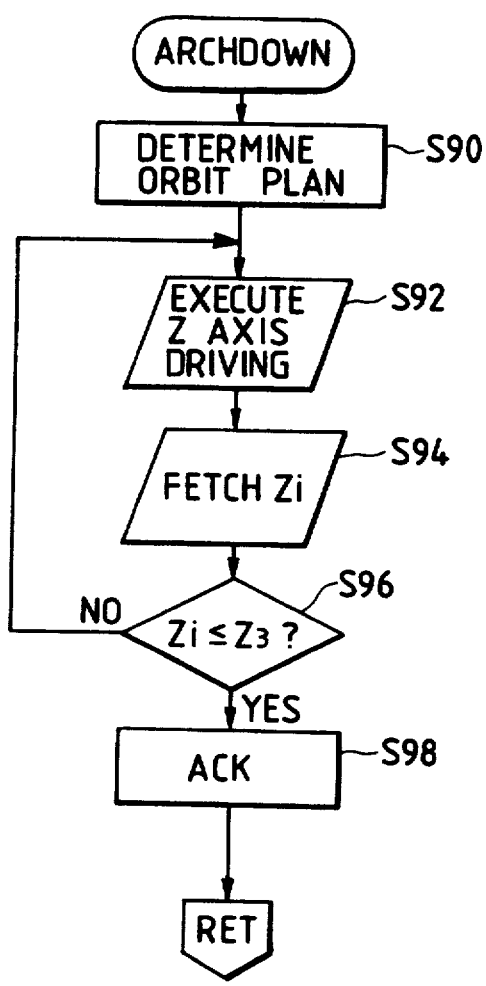

The ARCH command is shown in FIG. 10B.

When the interpreter fetches the ARCH command, the I/O command of code "0" is sent to the control unit 22. The position determination control unit 22 calculates point $P_G$ in step S72. After point $P_G$ is calculated, the loop in steps S74 to S78 and the loop in steps S80 to S82 are executed in parallel.

In the loop in steps S74 to S78, the servo motor in the X direction is driven (step S74), an encoder output ($x_i$) is read (step S76), and a check is made to see if the position of the arm in the X direction has exceeded $x_i > x_2$) point $P_2$ or not (step S78). In the loop in steps S80 to S82, the encoder output ($x_i$) is read (step S80) and a check is made to see if the position of the arm in the X direction has exceeded point $P_G(x_i > x_G)$ or not (step S82). Assuming that the X axis is set in the leftward direction in FIG. 1, since $x_G < x_2$, the timing when the answer in step S82 is determined to be YES is earlier than the timing when the answer in step S78 is decided to be YES. Thus, the process in step S84 is executed.

The ACK signal is returned to the interpretation portion 21. The interpretation portion 21 fetches the next command by the ACK signal.

Figure 11A:
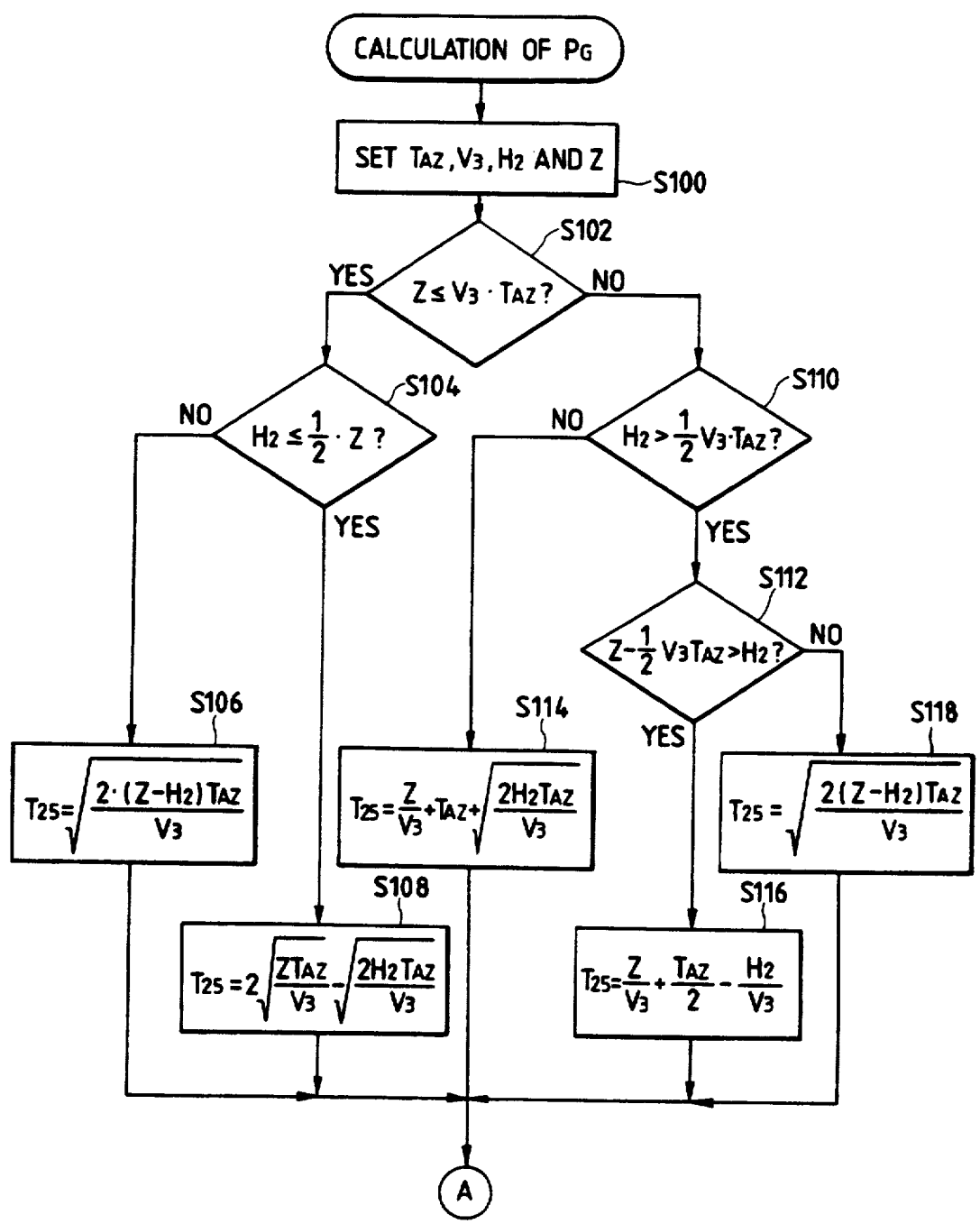
FIGS. 11A and 11B are flowcharts for calculating a point $P_G$.
Figure 11B:
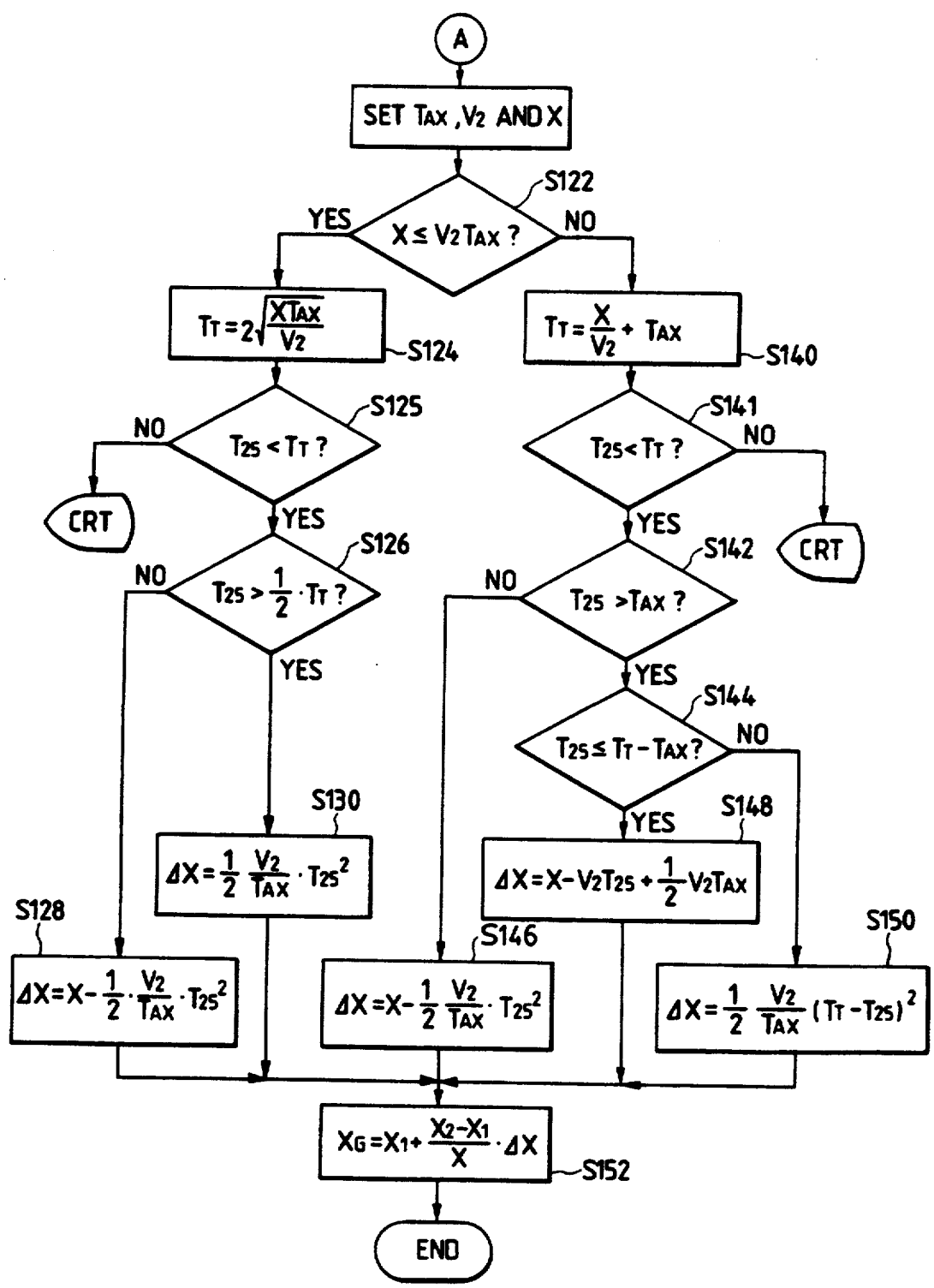

The details of the calculation control of point $P_G$ in step S72 will now be described with reference to a flowchart of FIG. 11. The control of FIG. 11 is equivalent to a process such that the distance $\Delta x$ of the movement which is executed in the horizontal direction is obtained in the time $T_{25}$ which is required when the movement in the Z direction is shifted from point $P_2$ to point $P_5$ as mentioned above. In step S100, the following values are defined on the basis of the orbit plan, parameters of the I/O commands, and the like. That is, $T_{AZ}$: accelerating time upon descent (=decelerating time)

$V_3$: maximum descending speed (speed in the equal velocity motion)

z: movement distance in the vertical direction ($=|P_3-P_2|$)

In step S102, the magnitudes of z and $V_3T_{AZ}$ are checked, thereby discriminating whether the equal velocity motion exists during the descent from $P_2$ to $P_3$ or not in the orbit plan which was made in step S70.

In the case where the equal velocity downward motion exists

As described in conjunction with FIG. 9, if $$z > V_3 \cdot T_{AZ}$$

the equal velocity downward motion exists. In this case, in steps S110 and S112, a check is made to see if point $P_5$ lies within the equal acceleration motion interval or the equal velocity motion interval or the equal deceleration motion interval.

Since $\frac{1}{2} V_3 \cdot T_{AZ}$ denotes the distance when the robot moves in the Z direction for the decelerating time period $T_{AZ}$, $$H_2 \leq \tfrac{1}{2} V_3 \cdot T_{AZ}$$

(NO in step S110) denotes that the deceleration is started at a position which is upper than $P_5$.

$$H_2 > \tfrac{1}{2} V_3 \cdot T_{AZ}$$

(YES in step S110) means that the deceleration is started at a position which is lower than $P_5$. If NO in step S110, the motion of the robot is executed in a manner such that the acceleration for the period of time $T_{AZ} \rightarrow$equal velocity motion at $V_3 \rightarrow$start of the deceleration$\rightarrow$passage at $P_5 \rightarrow$arrival at $P_3$. The time which is required when the robot arrives at $P_3$ from $P_2(P_2 \rightarrow P_3)$ is $$T_{AZ} + \frac{z - V_3 T_{AZ}}{V_3} + T_{AZ}$$

On the other hand, the time which is required for $(P_5 \rightarrow P_3)$ is $$\sqrt{\frac{2 \cdot H_2 T_{AZ}}{V_3}}$$

from $\frac{1}{2}\alpha t^2 = H_2$

Thus, as shown in step S114, $T_{25}$ is $$T_{25} = \frac{z}{V_3} + T_{AZ} + \sqrt{\frac{2 \cdot H_2 T_A}{V_3}}$$

If the deceleration is executed at a position lower than $P_5$ (YES in step S110), a check is made to see if $P_5$ lies within the acceleration motion interval or the equal velocity motion interval by discriminating the magnitudes between $H_2$ and $$(z - \tfrac{1}{2} V_3 \cdot T_{AZ}).$$

If $H_2 \geq z - \tfrac{1}{2} V_3 \cdot T_{AZ}$ (NO in step S112), the motion is executed at the equal acceleration $V_3/T_{AZ}$ for the period of time $T_{25}$. Therefore, $T_{25}$ is $$T_{25} = \sqrt{\frac{2(z - H_2)T_{AZ}}{V_3}}$$

as shown in step S118. On the contrary, if $P_5$ lies within the equal velocity motion interval, the accelerating time is $T_{AZ}$ and the equal velocity motion period of time until $P_5$ is $$\frac{z - H_2 - \tfrac{1}{2} V_3 \cdot T_{AZ}}{V_3}$$

Therefore, as shown in step S116, $$T_{25} = \frac{z - H_2}{V_3} + \frac{T_{AZ}}{2}$$

In the case where the equal velocity downward motion does not exist

If the equal velocity downward motion does not exist, $z < V_3 \cdot T_{AZ}$ and step S104 follows. In this case, there are two cases where the deceleration is executed before $P_5$ ($H_2 \leq \tfrac{1}{2} z$) and where the deceleration is performed after $P_5$ ($H_2 > \tfrac{1}{2} z$). In the former case, the time which is required for the movement of $P_2 \rightarrow P_3$ is $$2 \cdot \sqrt{\frac{2 \cdot \tfrac{1}{2} \cdot z \cdot T_{AZ}}{V_3}} = 2 \cdot \sqrt{\frac{z T_{AZ}}{V_3}}$$

from $$\tfrac{1}{2} \alpha \left(\frac{t}{2}\right)^2 = \frac{z}{2}$$

and the time which is required for the movement of $P_5 \rightarrow P_3$ is $$\sqrt{\frac{2H_2 \cdot T_{AZ}}{V_3}}$$

from $\frac{1}{2}\alpha t^2 = H_2$. Therefore,

-continued $$T_{25} = 2 \cdot \sqrt{\frac{zT_{AZ}}{V_3}} - \sqrt{\frac{2H_2 \cdot T_{AZ}}{V_3}}$$

As mentioned above, the value of $T_{25}$ is obtained in each case. Then, the distance $\Delta x$ of the movement which is executed in the X direction for the time period $T_{25}$ is calculated in accordance with a flowchart of FIG. 11B. In step S120, the following values are defined. That is, $T_{AX}$: accelerating time in the X direction (=decelerating time)

$V_2$: maximum speed (speed in the equal velocity motion)

x: movement distance in the horizontal direction $(=|P_2-P_1|)$

In step S122, the values of x and $V_2 \cdot T_{AX}$ are compared, thereby checking whether the equal velocity motion interval exists in the horizontal movement or not.

In the case where the equal velocity horizontal movement exists

In this case, the answer in step S122 is NO and step S140 follows. The period of time which is required for the acceleration and deceleration is set to $2T_{AX}$ and the period of time of the equal velocity motion is $(x-V_2 \cdot T_{AX})/V_2$, so that a time $T_T$ which is required for the horizontal movement from $P_1$ to $P_2$ is $$T_T = T_{AX} + \frac{x}{V_2}$$

In step S141, the magnitudes of $T_{25}$ and $T_T$ are compared. If $T_{25} > T_T$, this means that the downward motion is started at a position left of $P_1$ and such a situation is impossible, so that it is regarded as a program error.

In step S142, the magnitudes of $T_{25}$ and $T_{AX}$ are compared. If the downward start point $P_G$ is located before the start position of the deceleration of the horizontal movement, $$T_{25} > T_{AX}$$

If the downward start point $P_G$ is located after the start of the deceleration of the horizontal movement, $$T_{25} \leq T_{AX}$$

Figure 12A:
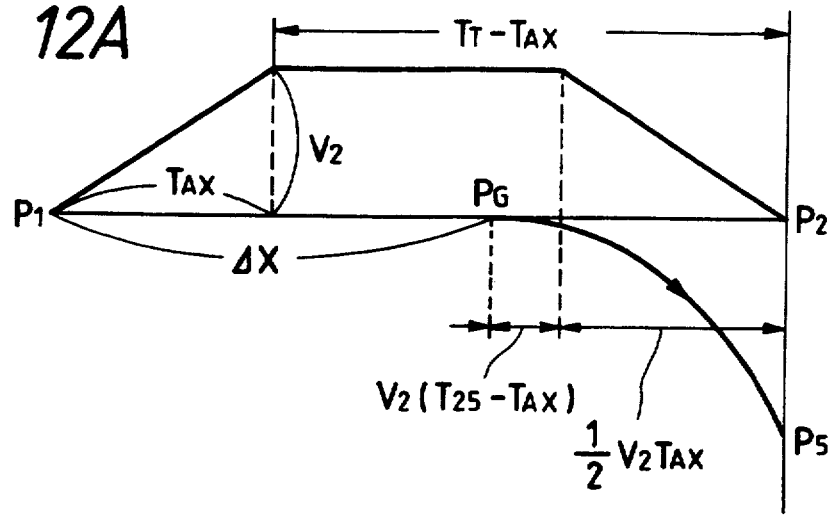
FIGS. 12A, 12B, 12C, 12D and 12E are diagrams for explaining methods of calculating the point $P_G$.

As shown in FIG. 12A, if the downward motion is started in the equal velocity motion interval, $$T_{25} \leq T_t - T_{AX}$$

(YES in step S144). Therefore, the distance $\alpha x$ of the movement of ($P_1 \rightarrow P_G$) is obtained by $$\Delta = x - |P_2 - P_G|$$
$$= x - \{V_2(T_{25} - T_{AX}) + \tfrac{1}{2} V_2 \cdot T_{AX}\}$$
$$= x - V_2 \cdot (T_{25} + \tfrac{1}{2} T_{AX})$$

as shown in step S148.

Figure 12B:
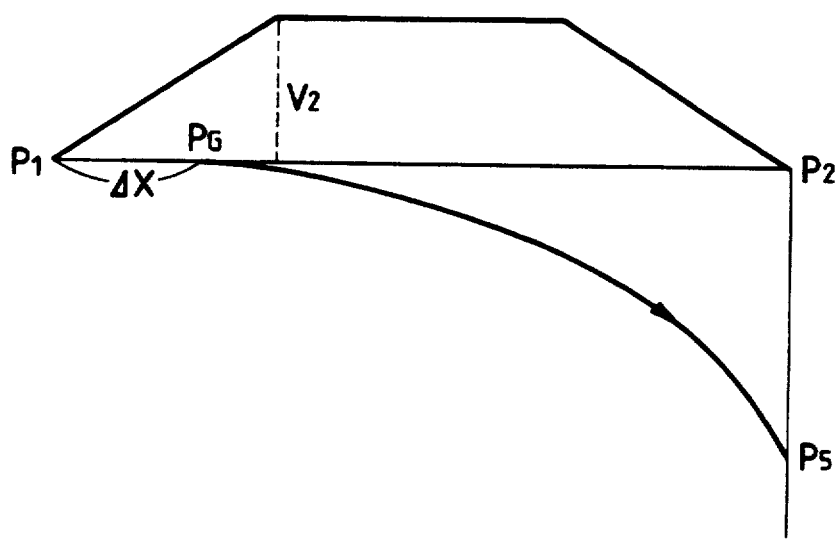

As shown in FIG. 12B, if the downward motion is executed for the accelerating period of time, $$T_{25} > T_T - T_{AX}$$

(NO in step S144), so that step S150 follows. In this case, since $$\Delta x = |P_G - P_1|,$$

$$\Delta x = \frac{1}{2} \cdot \frac{V_2}{T_{AX}} (T_T - T_{25})^2$$

Figure 12C:
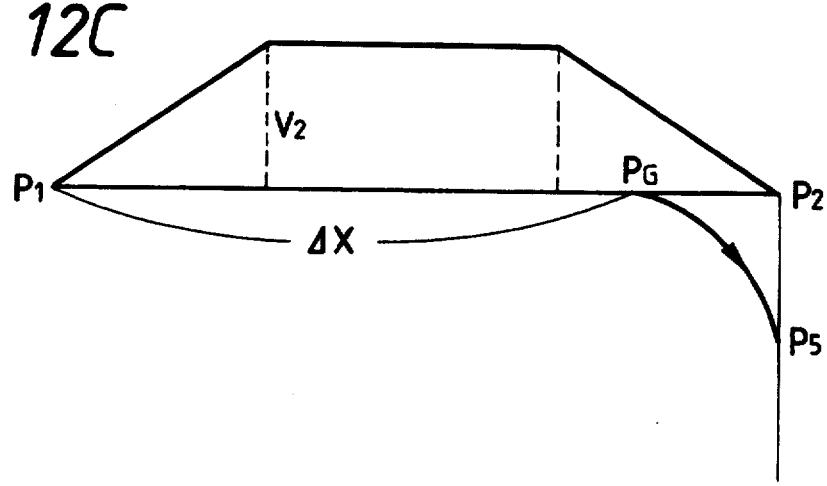

On the other hand, if it is determined that $T_{25} \leq T_{AX}$ in step S142, step S146 follows. At this time, since the downward motion is started for the decelerating period of time as shown in FIG. 12C, $$\Delta x = |P_G - P_1| = |P_1 - P_2| - |P_2 - P_G|$$

Thus, $$\Delta x = x - (\tfrac{1}{2})(V_2 T_{25}/T_{AX}^2)$$

In the case where the equal velocity horizontal movement does not exist

In this case, since $x \leq V_2 \cdot T_{AX}$, step S124 follows. As will be obvious from FIG. 12D, since the value of $T_T$ is twice as long as the period of time which is required from the start of the acceleration to the completion of the movement of the distance of $\tfrac{1}{2}x$, as shown in step S124, $$T_T = 2 \cdot \sqrt{\frac{x T_{AX}}{V_2}}$$

Figure 12D:
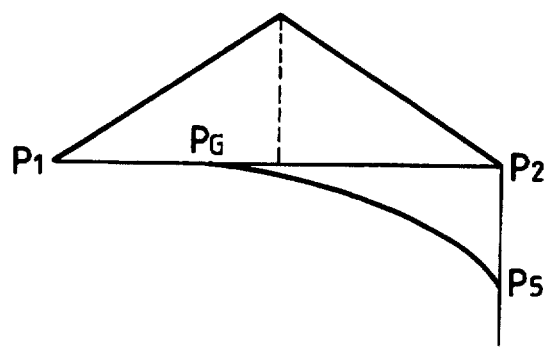

The process in step S125 has the same meaning as that in step S141. Since $\tfrac{1}{2} T_T$ is the time which is required for the deceleration, $$T_{25} > \tfrac{1}{2} T_T$$

means that the downward motion is executed before the start of the deceleration as shown in FIG. 12D. At this time, since $\Delta x$ is the distance between $P_1$ and $P_G$, that is, the distance of the movement which was executed by the acceleration for the period of time ($T_T - T_{25}$), $$\Delta x = \frac{1}{2} \cdot \frac{V_2}{T_{AX}} T_{25}^2$$

Figure 12E:
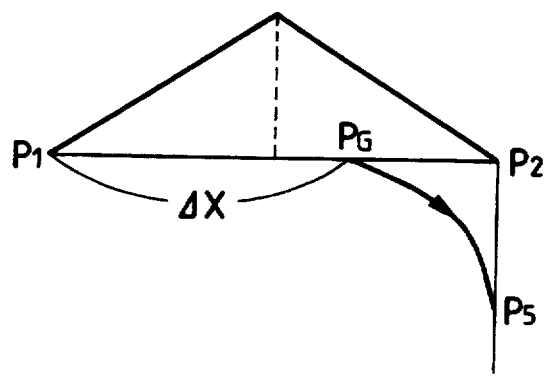

On the other hand, in the case where the downward motion is started after the start of the deceleration in the horizontal direction, $$\Delta x = x - |P_G - P_2|$$

as shown in FIG. 12E, so that $$\Delta x = x - \frac{1}{2} \cdot \frac{V_2}{T_{AX}} T_{25}^2$$

as shown in step S128. In this manner, the value of $\Delta x$ can be obtained in each case. In the next step S152, the X coordinate position $x_G$ of $P_G$ is calculated. That is, $$x_G = x_1 + \frac{x_2 - x_1}{x} \Delta x$$

In the above equation, $(x_2 - x_1)/x$ is set in consideration of the horizontal moving direction.

If the downward motion is started at $P_G$ obtained as mentioned above, the conditions of the above items e,crc/1/ to e,crc/4/ are satisfied.

That is, point $P_G$ is a passing point at which in the case where the downward motion was started toward point $P_3$, the robot can arrive at point $P_3$, in the shortest time by avoiding an obstacle. Therefore, at the time point when the robot has passed point $P_G$ the position determination control unit 22 returns the ACK signal to the interpretation portion 21. The interpretation portion interprets the next ARCHDOWN command and sends the I/O command to the position determination control unit 22. Thus, the robot arm avoids the obstacle and reaches point $P_3$ in the shortest time.

DETAILS OF THE EXECUTION OF THE ARCHDOWN COMMAND

According to the program of FIG. 3, when the ACK signal is returned to the interpretation portion at the time when the robot has passed point $P_G$ by the ARCH command, the OUT command, IF INP command, and ARCHDOWN command are executed. A control procedure of the position determination control unit 22 for the ARCHDOWN command is shown in FIG. 10C.

According to the embodiment described above,

I: By using the advanced robot language, it is possible to describe the robot control program to execute the operations in different directions in parallel while avoiding an obstacle. Therefore, the programmer can easily execute the program and the teaching and the optimum parallel movement can be executed so that the robot can be moved at a high speed.

II: Particularly, in the ARCH command, the height $H_2$ of obstacle, the maximum descending speed $V_3$, the target downward position $P_3$, etc. can be described. Therefore, not only can an obstacle be avoided but also the passing point $P_G$ to reach the target point $P_3$ in the shortest time is calculated by the control apparatus itself rather than the operator. Thus, the passing point $P_G$ which can be obtained only by repeating the trials and errors as in the conventional technique can be easily derived.

III: In the commands of the ARCHUP and ARCH systems, the previous movement command is incorrectly finished at the start time point of the movement in the different direction. Therefore, the programmer can insert a desired program procedure during the subsequent movement command. A degree of freedom in making of the control program increases.

The present invention can be variably modified within the spirit and scope of the appended claims of the invention.

For instance, in the embodiment of FIG. 1, two directions of X and Z have been set. However, other directions can be also set.

Figure 13:
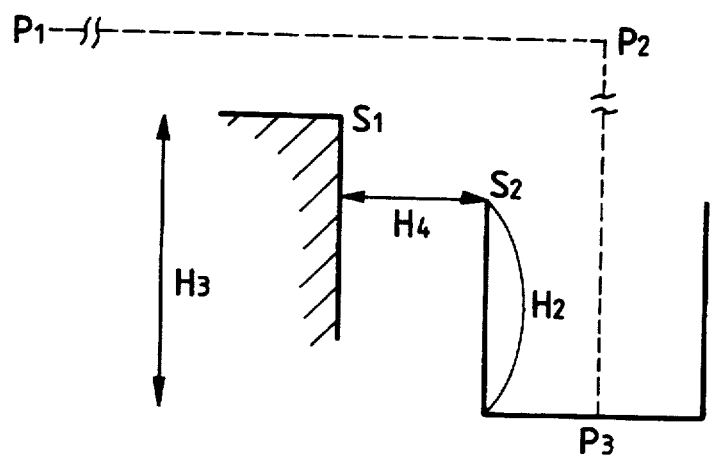
FIG. 13 is a diagram for explaining a modification.
Figure 14:
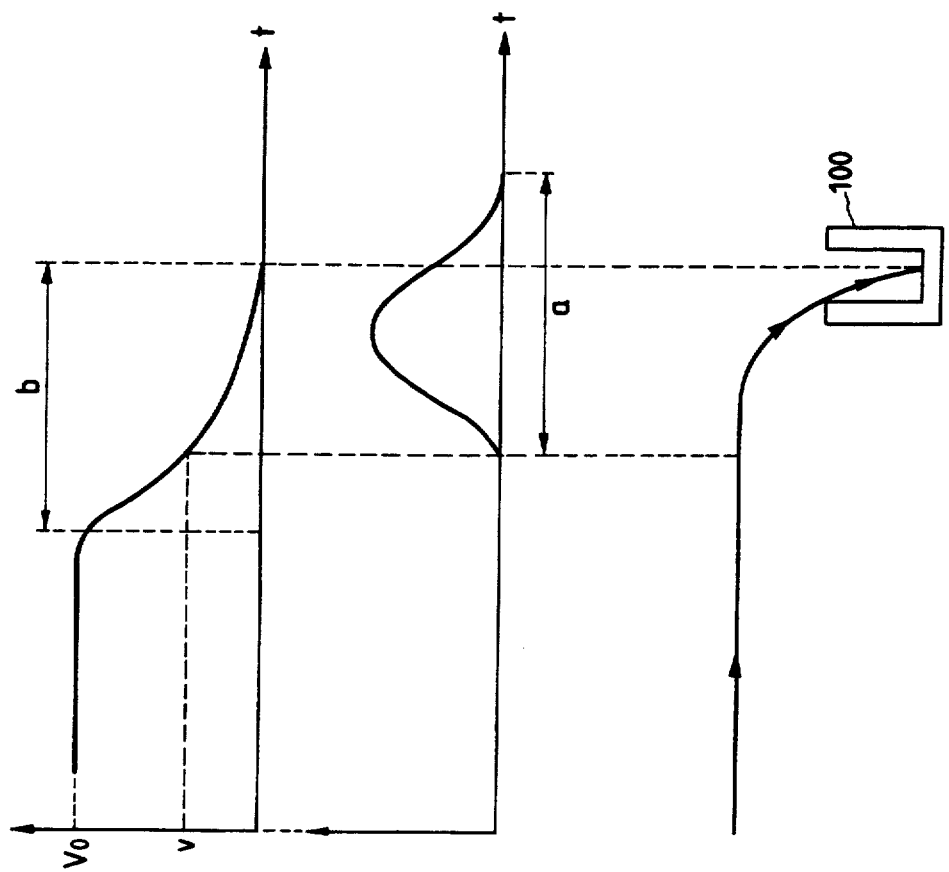
FIG. 14 is a diagram for explaining a conventional example.

On the other hand, the embodiment of FIG. 1 has been described with respect to the industrial robot as an example. In the industrial robot, in many cases, an obstacle appears in the height direction. However, as shown in FIG. 13, there is a case where two points $S_1$ and $S_2$ exist as points which the arm must avoid. Even in such a case, the ARCH command to which the invention is applied becomes

ARCH $P_2$, $P_3$, $V_3$; $H_2$; $H_3$; $H_4$

In the above command, point $S_2$ which is specified by $P_3$ and $H_2$ is the avoiding point as described in FIG. 1. Point $S_1$ exists at the position of the height $H_3$ from point $P_3$ and is the point existing at the position corresponding to the distance $H_4$ in the horizontal direction from $S_2$. In such a command, the orbit is controlled in the following manner. First, with respect to point $S_1$, an orbit is made and passing point $P_G'$ is calculated in the same manner as the foregoing embodiment. In addition, with respect to point $S_2$ as well, an orbit is made and passing point $P_G'$ is calculated. If two orbits which were independently calculated with respect to one of $S_1$ and $S_2$ do not interfere with those of the other point, $P_G'$ or $P_G''$ which is nearer to point $P_1$ is used as $P_G$. If one of the two orbits which were independently calculated with respect to one of $S_1$ and $S_2$ interferes with that of the other point, the orbit on the side which does not interfere is used. The present invention can be expanded and applied even to a model such that two interference points exist as mentioned above.

In the above embodiment of FIG. 1, $H_1$ and $H_2$ have been used as height information of the straight line portion which are added to the ARCHUP and ARCH commands. However, they can be also described by points $P_4$ and $P_5$ in place of them.

In the embodiment of FIG. 1, the interpretation portion is of the interpreter type. However, as the program interpretation portion, in the case of using a compiler type program system which all of the commands have previously been set into the execution form, the target value and velocity of the descending command added to the horizontal movement command are preliminarily read and compiled and, thereafter, they can be added. Therefore, even if they do not exist in the horizontal movement command, the similar advantages are obtained.

If the movement amount is not 0 on the horizontal movement axis, even when the horizontal position at which the downward motion can be started is calculated with respect to any axis, the similar advantages can be derived.

In case position determination control unit 22 for calculating the position every servo cycle is used in place of the calculation of the horizontal position at which the downward motion can be started, even if the timing calculation is used, the similar advantages can be derived.

On the other hand, the orbit plan is not limited to the trapezoidal control but can be also made by other control.

Even when the horizontal position at which the downward motion can be started is calculated by the program interpretation portion instead of the position determination control unit 22, the similar advantages can be obtained.

We claim:

1. A method of controlling a robot so as to prevent coming into touch with an obstacle, comprising the steps of:
continuously controlling the robot from a movement in a first direction to a movement in a second direction perpendicular to the first direction, and
concurrently executing the movements in the first and second directions from a predetermined position in the movement in the first direction,
wherein the predetermined position is determined by:
a) inputting a target movement position in the first direction;

b) inputting a target movement position in the second direction;

c) inputting a first distance which is necessary to execute the movement in only the second direction, the first distance being necessary to prevent coming into touch with the obstacle; and d) calculating said predetermined position on the basis of the target movement in the first direction, the target movement in the second direction and the first distance which were input in said steps a), b), and c).

2. A method according to claim 1, wherein said first direction is a horizontal direction and said second direction is a vertical direction.

3. A method according to claim 1, wherein in said step d), said predetermined position is set to a position which is preceding from said target movement position in the first direction by only a second distance of the robot which moves in the first direction for a period of time from the start of the movement in the second direction to the arrival at a head position of the first distance.

4. A method according to claim 1, wherein the movements in the first and second directions include an equal acceleration motion and an equal deceleration motion.

5. A method according to claim 4, wherein periods of time of said equal acceleration motion and said equal deceleration motion are equal.

6. A method according to claim 1, wherein said first distance relates to a length of the obstacle in the second direction.

7. An apparatus for controlling a robot so as to prevent coming into touch with an obstacle, in which when the robot is continuously controlled from a movement in a first direction to a movement in a second direction perpendicular to the first direction, the movements in the first and second directions are executed concurrently from a predetermined position in the movement in the first direction, comprising:

a first position determination control unit in the first direction;

a second position determination control unit in the second direction for controlling independently of the first direction; and arithmetic operating means for calculating a period of time from the start of the movement in the second direction to arrival at the head position of a first distance, which is necessary to prevent coming into touch with the obstacle, and at which it is necessary to execute only a moving motion in the second direction in response to a target position in the movement in the first direction, a target position in the movement in the second direction, and said first distance and, said arithmetic operating means, further, being operative to calculate a position which precedes the target position in the movement in the first direction by only the movement distance in the first direction in said period of time, wherein said second position determination control unit is operative to set the position that precedes the target position to said predetermined position and to start a control in the second direction when the robot has passed the predetermined position.

8. An apparatus according to claim 7, wherein said first direction is a horizontal direction and said second direction is a vertical direction.

9. An apparatus according to claim 7, wherein the movements in the first and second directions includes an equal acceleration motion and an equal deceleration motion.

10. An apparatus according to claim 9, wherein periods of time of said equal acceleration motion and said equal deceleration motion are equal.

11. An apparatus according to claim 7, wherein said arithmetic operating means includes means for interpreting commands to designate the target position in the movement in the first direction, the target position in the movement in the second direction, and the first distance.

12. A method of controlling a robot comprising a controlling unit for controllably moving the robot in a first direction and a second direction perpendicular to the first direction, and a command interpreting unit supplying a command of movement start to said controlling unit, wherein movements in the first and second directions are executed concurrently from a predetermined position in the movement in the first direction, comprising the steps of:

a) interpreting, in said command interpreting unit, the command described in a program for moving the robot;

b) calculating, in said command interpreting unit, the predetermined position based on a parameter included in the command;

c) transmitting the command for movement start in the first direction and a data concerned with the predetermined position from the command interpreting unit to said controlling unit;

d) monitoring, in said control unit, a position of the robot during the movement in the first direction; and responsive to a detection that the robot arrives at the predetermined position, continuing the movement in the first direction and transmitting to said command interpreting unit a signal indicating that the robot has arrived at the predetermined position; and e) executing, in said command interpreting unit, an interpretation of the command responsive to the signal from said controlling unit.

13. A method according to claim 12, wherein in said step b), said predetermined position is obtained on the basis of a target position in the movement in the first direction, a target position in the movement in the second direction, and a first distance which is necessary to execute the movement in only the second direction.

14. A method according to claim 12, wherein during the step e), said command interpreting unit interprets a command for movement in the second direction, and transmits a command for movement start in the second direction to said control unit.

15. A method according to claim 12, wherein said first direction is a horizontal direction and said second direction is a vertical direction.

* * * * *

UNITED STATES PATENT AND TRADEMARK OFFICE
CERTIFICATE OF CORRECTION

PATENT NO. : 5,357,598

DATED : October 18, 1994

INVENTORS : KATSUMI ISHIHARA ET AL.

It is certified that error appears in the above-identified patent and that said Letters Patent is hereby corrected as shown below:

COLUMN 1

Line 37, "point" should be deleted.
Line 50, "realize," should read --realize--.

COLUMN 2

Line 1, "executed," should read --executed--.
Line 11, "in-" should be deleted.
Line 12, "herently can" should read --can inherently--.
Line 13, "appreciated," should read --appreciated--.

COLUMN 3

Line 14, "provide" should read --provide a--.
Line 26, "the" should be deleted and "of an obstacle" should be deleted.

COLUMN 5

Line 7, "be also" should read --also be--.
Line 18, "operated" should read --is operated--.
Line 24, "$P_G$the" should read --$P_G$, the--.
Line 32, "Ax" should read --$\Delta x$--.

COLUMN 6

Line 44, "soon immediately" should read --immediately decelerated--.
Line 57, "equation" should read --equations--.

UNITED STATES PATENT AND TRADEMARK OFFICE
CERTIFICATE OF CORRECTION

PATENT NO. : 5,357,598

DATED : October 18, 1994

INVENTORS : KATSUMI ISHIHARA ET AL.

Page 2 of 3

It is certified that error appears in the above-identified patent and that said Letters Patent is hereby corrected as shown below:

COLUMN 8

Line 18, "with" should read --will--.
Line 23, "from" should read --at--.
Line 60, "$x_i > x_2$)" should read --$(x_i > x_2)$--.

COLUMN 9

Line 44, "upper" should read --higher--.

COLUMN 11

Line 52, "$T_{25} \leq T_t - T_{AX}$" should read --$T_{25} \leq T_T - T_{AX}$--.
Line 54, "distance $\alpha x$" should read --distance $\Delta x$--.
Line 57, "$\Delta = x - |P_2 - P_G|$" should read --$\Delta x = x - |P_2 - P_G|$--.

COLUMN 13

Line 3, "e,crc/1/ to e,crc/4/" should read --①  to ④--.
Line 4, "which" should read --which,--.
Line 6, "$P_3$," (2nd occurrence) should read --$P_3$--.
Line 8, "point" should be deleted and "point $P_G$" should read --point $P_G$,--.

UNITED STATES PATENT AND TRADEMARK OFFICE
CERTIFICATE OF CORRECTION

PATENT NO. : 5,357,598

DATED : October 18, 1994

INVENTORS : KATSUMI ISHIHARA ET AL.

It is certified that error appears in the above-identified patent and that said Letters Patent is hereby corrected as shown below:

COLUMN 14

Line 9, "point $P_G'$" should read --point $P_G''$--.
Line 27, "which" should read --in which--.
Line 41, "case" should read --case the--.
Line 48, "be also" should read --also be--.

COLUMN 16

Line 7, "includes" should read --include--.

Signed and Sealed this

Sixteenth Day of May, 1995

Attest:

BRUCE LEHMAN

Attesting Officer     Commissioner of Patents and Trademarks